Oct. 14, 1969    A. H. VEDVIK ETAL    3,471,918
MACHINE FOR PLACEMENT, CUTTING, FASTENING TRANSPARENT
PLASTIC WINDOWS IN COVER RINGS
Filed Oct. 14, 1966    7 Sheets-Sheet 1

INVENTORS
ANDREW H. VEDVIK
FREDERIC H. MIDDLETON
BY
Trent, Lockwood,
Greenawalt & Dewey
ATTYS.

INVENTORS
ANDREW H. VEDVIK
FREDERIC H. MIDDLETON

Oct. 14, 1969 A. H. VEDVIK ETAL 3,471,918
MACHINE FOR PLACEMENT, CUTTING, FASTENING TRANSPARENT
PLASTIC WINDOWS IN COVER RINGS
Filed Oct. 14, 1966 7 Sheets-Sheet 5

INVENTORS
ANDREW H. VEDVIK
FREDERIC H. MIDDLETON
BY
*Trust, Lockwood,*
*Greenawalt & Dewey*
ATTYS.

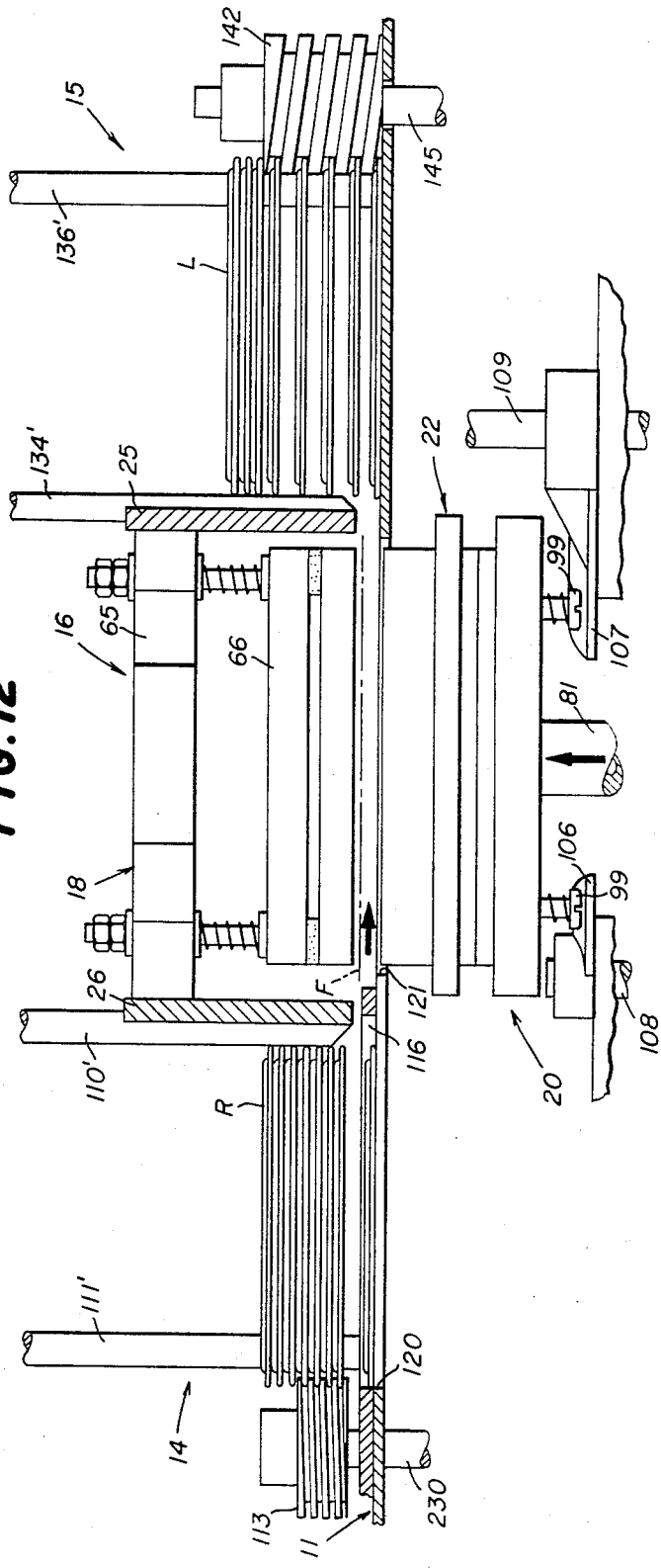
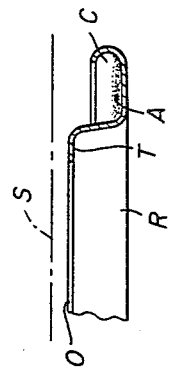
FIG.14
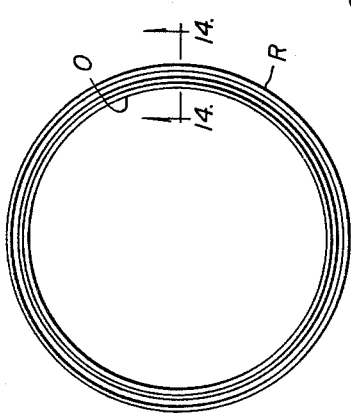
FIG.13
FIG.12

United States Patent Office 3,471,918
Patented Oct. 14, 1969

3,471,918
MACHINE FOR PLACEMENT, CUTTING, FASTENING TRANSPARENT PLASTIC WINDOWS IN COVER RINGS
Andrew H. Vedvik and Frederic H. Middleton, Madison, Wis., assignors to Oscar Mayer & Co., Inc., Chicago, Ill., a corporation of Illinois
Filed Oct. 14, 1966, Ser. No. 586,745
Int. Cl. B23p *19/04;* B23q *7/10*
U.S. Cl. 29—208
22 Claims

ABSTRACT OF THE DISCLOSURE

Apparatus for placing window forming transparent film sheets in ring-type metal closures in which ring closure members are fed from the bottom of a supply magazine to a work station by a reciprocating pusher which simultaneously moves the preceding ring member from the work station into position for insertion in a finished product stack, the work station having a vertically reciprocating head on which the empty rings are positioned and carried upwardly against a spring backed tamping head located above the path of a film web which is fed between the two heads, the ring carrying head having a film trimming knife member and the tamping head having an anvil forming portion co-operating with the trimming knife for cutting a window forming sheet from the web which is tamped into the ring and held assembled with the same by an adhesive in the upwardly opening seam forming channel portion of the ring.

---

This invention relates to package forming and is more particularly concerned with improvements in apparatus for cutting sheets of film material from a continuous web thereof and positioning the cut sheets in ring-type closure members so as to form lids for containers.

One type of package which has been developed for marketing food products, such as liver sausage, chili con carne, cheese or other products of various kinds, employs a tray-like container, which is of pie pan form and fabricated from relatively thin gauge deformable material such as thin gauge aluminum, with a closure lid comprising a sealing ring member and a window forming transparent plastic sheet, which is attached to the rim at the mouth of the container, the sealing ring member being fabricated from material which will permit a crimp seam to be formed with the peripheral edge portion coiled during the seaming operation. A package of this type is disclosed in Seiferth and Austin Patent No. 3,221,692, dated Dec. 7, 1965.

In the manufacture of the package of the type described, it has been the practice to place a sheet of transparent plastic film over the mouth of the tray after it is filled with the product, to position a metal closure ring on top of the sheet in alignment with an edge flange on the tray and to complete the package by a double seam forming operation in conventional can seaming machinery. The use of this package has been limited primarily because of the low production rate resulting from the hand assembling operations. Therefore, an object of the present invention is to provide a machine for automatically assembling the closure sheets and sealing rings of this type package so as to provide a closure member for the tray which may be positioned thereon in a single operation.

A more specific object of the invention is to provide an apparatus for feeding film material from a film supply, cutting from the film sheets of predetermined size, and positioning each cut sheet relative to a sealing ring so that its margins are held in the seam forming flange of the ring by an adhesive which serves as a sealing compound when the assembly is subsequently employed as a closure on a container.

It is a more specific object of the invention to provide an apparatus for automatically cutting a closure forming sheet of film from a web supply and positioning the cut sheet in a ring-like closure forming member for a container which ring-like member is characterized by a narrow peripherally extending seam forming channel in which there is deposited an adhesive material in sufficient quantity to hold the sheet in position during a subsequent seaming operation which attaches the lid to the mouth of a container.

These and other objects and advantages of the invention will be apparent from a consideration of the apparatus which is shown by way of illustration in the accompanying drawings wherein:

FIGURE 11 is a partial plan view, with portions broken away, showing part of FIGURE 1 to a larger scale;

FIGURE 12 is a vertical sectional view, taken substantially on the line 12—12 of FIGURE 1 to an enlarged scale and with portions broken away;

FIGURE 13 is a plan view of one of the closure ring elements; and

FIGURE 14 is a fragmentary sectional view taken on the line 14—14 of FIGURE 13.

Figure 1:
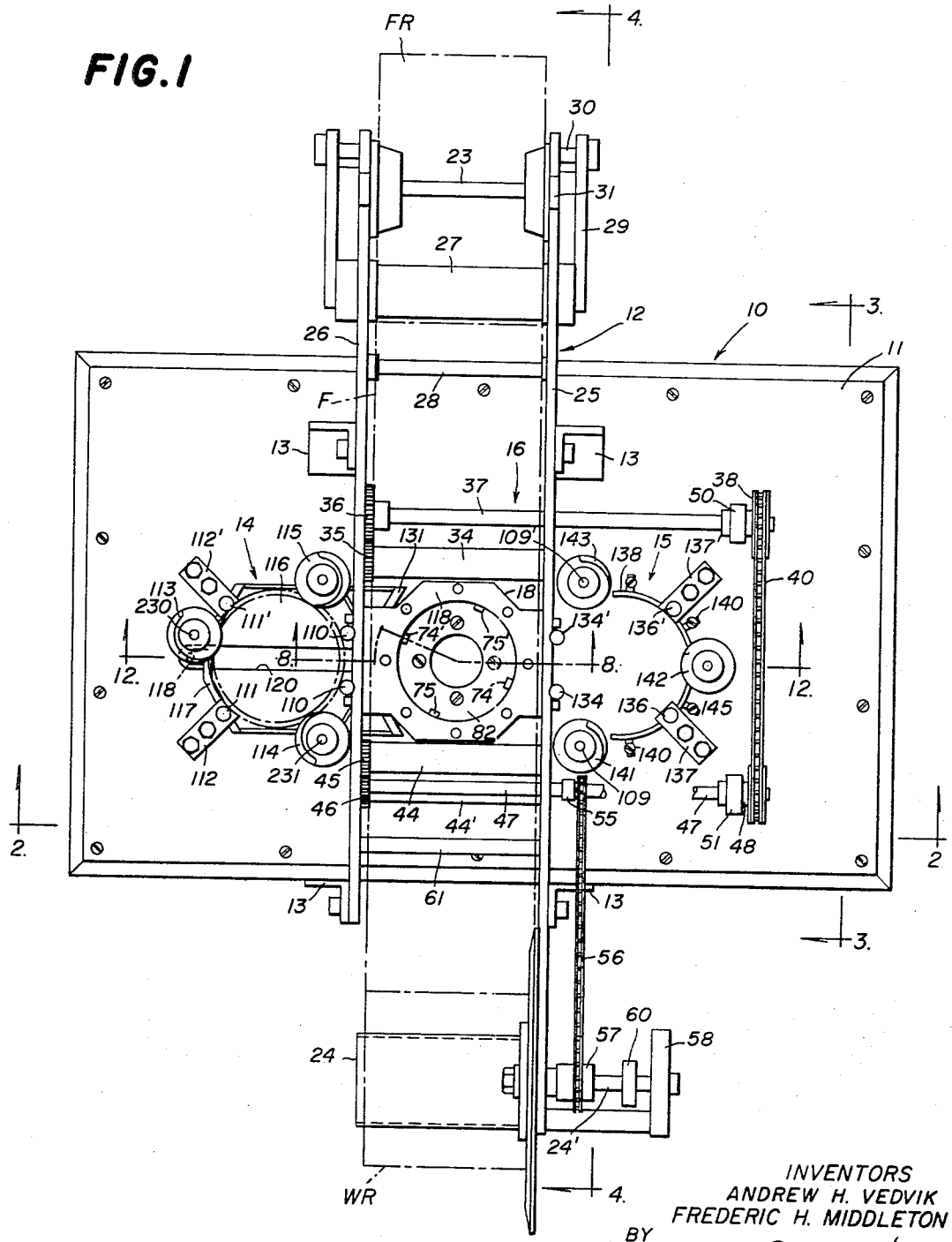
FIGURE 1 is a plan view of a machine for assembling window forming sheets of plastic film material in the center opening of a ring-type closure member for a container.

The illustrated machine is designed to feed ring-type container closure lid or cover elements successively from a supply magazine to an assembly station where they are positioned under a continuous web of transparent film material from which a window forming sheet of proper size is cut and placed in the center opening of each successive ring where it is held by an adhesive previously deposited in the peripheral seam forming channel portion of the ring and thereafter the completed closure lid is moved into the bottom of a stack for subsequent removal from the machine.

Referring first to FIGURES 13 and 14, the closure or sealing ring R, which is fed through the machine in inverted position, has an upwardly opening, peripheral channel C, the inner wall of which merges into a horizontal top panel T, the major portion of which has been cut out to form a center opening O. The opening O is covered in the completed closure assembly or lid L by a sheet S cut from the transparent film F which serves as a window and which has its margins pressed into an adhesive A deposited in the seam forming channel C.

The machine (FIGURES 1, 2, 3, 4 and 12) comprises a cabinet forming base frame structure 10 having a horizonally disposed table forming top 11 and a transversely disposed rectangular top frame 12 extending across the table top 11 in spaced relation above the top surface thereof. The frame 12, which is attached to the base frame 10 by upstanding angle brackets 13 is centered on the table 11 and extends between two magazines 14 and 15 which are spaced longitudinally of the base 10. The magazine 14 is adapted to receive a supply of the closure rings R in vertically stacked relation and the magazine 15 is adapted to receive a vertical stack of the finished lids L. The two magazines 14 and 15 are in alignment longitudinally of the base frame 10 and disposed on opposite sides of a work station 16 where the rings R are provided with film sheets S. The frame 12 is centered in the direction transversely of the base frame 10 relative to the work station 16, and carries a tamping ring assembly 18 which is centered over the work station 16 and also aligned relative to the vertical path of a reciprocating plunger assembly 20, on the top end of which there is provided a ring supporting, film holding, film tamping and film severing head assembly 22 with which the tamping ring assembly 18 co-operates in positioning the rings and film and cutting and securing a sheet S to each successive ring R.

The frame 12 extends at its ends on opposite sides of the base frame 10 and carries at one end a cross shaft 23 on which a supply roll FR (FIGURES 1 and 4) of film F is mounted. At the other end the frame 12 carries a drum 24 adapted to receive waste film after the window forming sheets S have been cut therefrom and to accumulate the same in a waste roll WR. The shaft 23 is journaled at its opposite ends in parallel, vertically disposed frame side plates 25 and 26, the latter being connected and held in laterally spaced relation by suitable cross frame members some of which also serve to support idler rolls for guiding the film between the film supply roll and the waste roll. The film F is pulled from the supply roll FR around the roller 27 and over the idler roller 28. The roller 27 is journaled at opposite ends in a frame 29 which is pivotally mounted on the frame 12 at 30. A brake indicated at 31 may be associated with the roll support shaft 23. The film is advanced between a pair of rubber covered feed rolls 34 and 34' which are aligned vertically with the film traveling over the top roll 34 back between the two rolls and down around the bottom roll 34'. The top roll 34 is driven through the gear 35 which engages with a gear 36 on a cross shaft 37. The shaft 37 extends through the one frame plate 25 and carries a sprocket 38 which is connected by the chain 40 with the sprocket 41 (FIGURES 2 and 3) on the driven shaft 42, the latter being locked to a one-way sprag clutch 43 which locks in the drive position but can be overridden to allow hand operation of the film advancing mechanism. The film advances across the assembly station 16 beneath the tamping ring assembly 18 and is threaded between a pair of horizontally aligned driven take-up rolls 44 and 44'. The roll shafts for rolls 44 and 44' are journaled in the side frame plates 25 and 26 and connected in driving relation by gears 45 and 45' with gear 45' engaging a driving gear 46 on the cross shaft 47. The cross shaft 47 extends through the frame plate 25 and carries a sprocket 48 which is connected by chain 40 with the sprocket 38 on shaft 37 and the sprocket 41 on driven shaft 42. The chain 40 and the sprockets 38 and 48 may be enclosed in a housing (not shown) which also covers the upper ends of bearing brackets 50 and 51 for the ends of the shafts 37 and 47. Cross shaft 47 also carries a sprocket 55 which is connected by the chain 56 with sprocket 57 on the drum shaft 24' on which the waste roll WR is accumulated. The shaft 24' has its end extended and supported in a bearing bracket 58 outboard of the frame plate 25 and carries a slip clutch assembly indicated at 60 which is associated with the sprocket 57. The waste film web which results after the film sheets have been cut from the supply web passes between the take-up rolls 44 and 44', and over an idler roll 61 to the waste roll WR.

Figure 8:
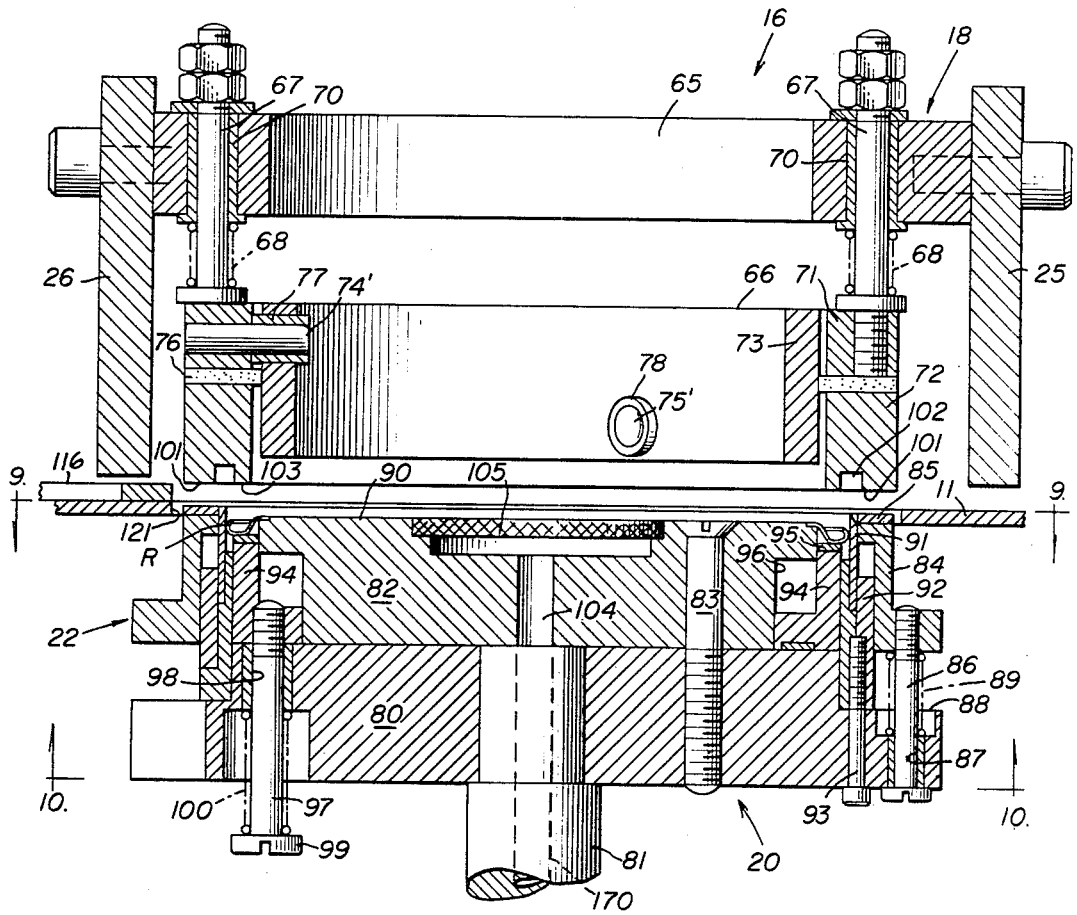
FIGURE 8 is a partial vertical section, taken substantially on the line 8—8 of FIGURE 1, to an enlarged scale.
Figure 9:
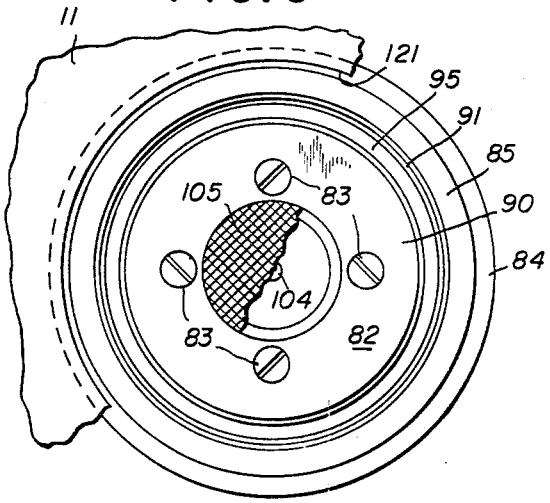
FIGURE 9 is a fragmentary horizontal section taken on line 9—9 of FIGURE 8.
Figure 10:
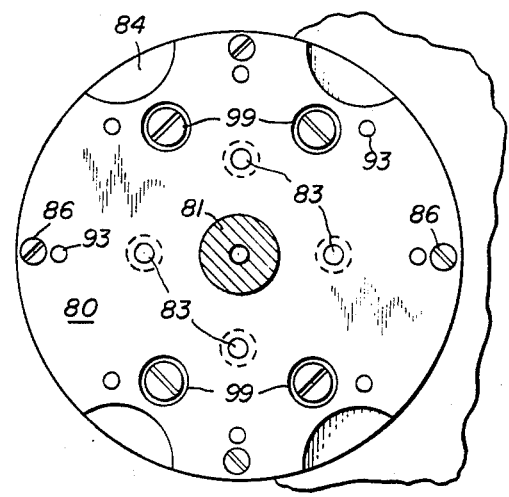
FIGURE 10 is a fragmentary horizontal section taken on line 10—10 of FIGURE 8.

The tamping ring assembly 18 (FIGURE 1) which is carried at the center of the top frame 12 and which is secured between upper marginal portions of the plates 25 and 26 at the work station 16 comprises an apertured top plate 65 (FIGURES 8 to 12) and a tamping ring mechanism 66 suspended beneath the same by depending hanger bolts 67 on each of which there is a compression spring 68 normally holding the mechanism 66 at a predetermined distance below the top plate 65. The hanger bolts 67 are mounted for vertical movement in sleeve bearings 70 (FIGURE 8) spaced about the margin of plate 65. The hanger bolts or pins 67 are secured at the bottom ends to an outer ring member 71 which supports a lower outside ring 72 and an inner sleeve ring 73. The inner ring 73 is in the form of a short tubular section which is pivotally connected by pins 74 and 74' to the top outside ring 71 and by pins 75 and 75' to the lower outside ring 72 with the two rings 71 and 72 being separated by a washer 76 of foam rubber or the like which is cemented to the oppositely disposed faces of the two ring members 71 and 72. The pins 74 and 74' are located in bearing sleeve members 77 (FIGURE 8) near the uppermost edge of the inner ring member 73 while the pins 75 and 75' are seated in like resilient sleeve 78 near the lowermost edge of the ring member 73. This permits pivoted movement of the ring member 72 in two planes. The tamping ring assembly 18 is positioned so as to co-operate with the ring carrying head 22 on the top of the reciprocating plunger assembly 20.

The head 22 (FIGURES 1, 2, and 8 to 11) comprises a bottom support plate 80 mounted on the top end of the piston rod 81 and a top plate 82 centered thereon and secured thereto by bolts 83. A film holding ring 84 of generally Z-shaped cross section having a film engaging top pad member 85 is secured on the upper ends of a plurality of headed pins 86 which are slidable in bearing sleeves 87 in apertures spaced about the periphery of the base plate 80. The outermost top edge of plate 80 is cut away to form a peripheral shelf 88 in which pins 86 are mounted. Compression springs 89 on the pins 86 normally hold ring 84 in an elevated position with the top of the film engaging pad 85 somewhat above the top surface 90 of the top plate 82, and spaced a predetermined distance outboard of the outer edge of plate 82. A knife ring 91 is positioned immediately inside of the film holding ring 84 and mounted on the upper edge of sleeve member 92 which is secured by bolts 93 in fixed relation on peripheral shelf 88 of bottom plate 80. The top cutting edge of the knife blade 91 extends above the top surface 90 of the top plate 82 and approximately on the level of the film engaging pad 85 on the film holding ring 84. The main portion of the ring 84 telescopes the knife supporting sleeve 92 and the two members are cut away so that the ring 84 may be depressed thereby compressing the springs 89 and lowering the pad 85 below the knife edge. An ejector ring 94 is mounted between the top plate 82 and the knife holder 92 with a pad member 95 on the top edge thereof. The plate 82 is cut away at 96 to provide a recess or guideway for vertical movement of the ejector ring 94. The ejector ring 94 which is L-shaped in cross section is secured on the top of depending headed pins 97 which are slidably mounted in vertically disposed bearing sleeves 98 spaced about the periphery of the bottom plate 80 and having their headed ends 99 extending below the bottom of the base plate 80 an appreciable distance. The pins 97 carry compression springs 100 which normally hold the ejector ring 94 in retracted or depressed position with the top ring engaging pad 95 disposed below the top face 90 of the top plate 82.

The rings R are fed in succession to the head 22 while the top face 90 is below the table surface 11 with each ring being received on the top face of the ejector ring 94. The head 22 is then raised by vertical movement of the piston rod 81 to bring the top surface of the film holding ring 84 into engagement with the film. The head 22 continues to rise so as to bring the film holding ring 84 into engagement with the downwardly facing marginal portion 101 on the outside tamping ring 72. The film holding ring 84 is depressed by further upward movement of the head 22 and the film is cut by the knife 91 which moves into the groove 102 in the tamping ring 72. The ring R which is resting on the ejector ring 94 is forced upwardly against the downwardly facing edge 103 of the tamping ring 72, the springs 68 being compressed to permit this movement of the head 22. The pressure of the ring edge 103 on the cut margin of the film forces the latter into contact with the adhesive A in the seaming channel C of the ring R.

On the downward stroke of the piston assembly 20 vacuum is applied through the axial passageway 104 in the head 22 and piston rod 81 and the porous cover pad 105 to strip the finished lid from the tamping ring assembly 18. Once clear, air pressure is substituted for vacuum and the finished lid is broken free from the piston assembly 20. Near the end of the downward stroke the ejector pins 97 are moved to bring their headed ends 99 to a position where they are engaged by ejector cams 106, 106' and 107, 107' which are mounted on the vertically disposed shafts 108, 108' and 109, 109'.

Figure 5:
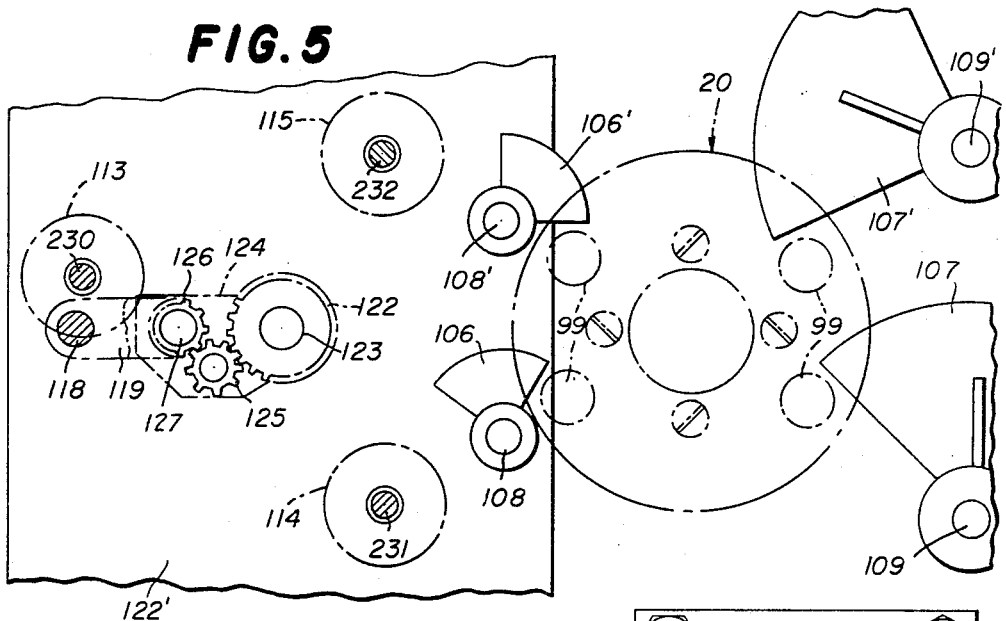
FIGURE 5 is a fragmentary horizontal section, taken on the line 5—5 of FIGURE 2 to an enlarged scale.

The ring magazine 14 (FIGURES 1, 2 and 12) which holds the supply of rings R comprises two pairs of cage forming vertical posts 110, 110' and 111, 111' spaced so as to accommodate a stack of rings R in inverted position. The posts 110, 110' are spaced apart and secured at their lower ends on the outside face of the vertical frame plate 26 with the bottom ends spaced above the table top 11 so as to provide clearance for feeding of the bottom ring from the stack. The other pair of posts 111, 111' are spaced at the opposite side of the magazine and secured in upstanding parallel relation on the top 11 by angle brackets 112, 112'. Three spirally grooved feed rolls or drop rolls 113, 114 and 115 are disposed immediately above the table top 11 at the bottom of the magazine 14 so as to receive the bottom rings R in the stack and by rotation thereof separate the lower rings and drop successive rings R into a feed ring or frame 116 (FIGURE 11) which is mounted for horizontal reciprocation at the bottom of the magazine. The feed ring 116 slides on the top 11 and has a pusher forming member 117 at its outboard edge for engaging the bottom ring R. The feed ring 116 is pivotally attached by pin 118 to the end of a feed stroke arm 119 (FIGURE 5), the connecting pin 118 extending through a slot 120 in the table top 11 which opens at its inner end into the circular opening 121 which accommodates the head 22. The feed stroke arm 119 is reciprocated by means of a fixed sun gear 122 mounted on a plate 122' through which a drive shaft 123 drives a planet arm 124 on which there is mounted an idler gear 125 meshing with the fixed sun gear 122 and an output planet gear 126 which is keyed to shaft 127 with the latter also keyed to the lid stroke arm 119. The slide ring 116 is provided with laterally projecting slide members 128, 128' which are received in guideway forming members 130, 130' extending along opposite sides of the opening 121. When shaft 123 rotates the slide ring 116 is reciprocated to feed empty rings R to the work station 16. At the same time a finished lid L, which is resting on the head 22, is engaged by the end pusher formation 131 on the slide ring 116 and removed from the work area into the lid magazine 15 at the opposite side of the work station 16. The movement of the head is controlled to drop first to the level of table 11 and then to a lower position to receive a ring R which is advanced by the feed ring 116.

The magazine 15 (FIGURES 1, 3 and 12) which receives the finished lids L comprises two pairs of upstanding cage forming post members 134, 134' and 136, 136'. The post members 134, 134' are spaced apart and secured at their lower ends on the frame plate 25 with the bottom ends thereof spaced from the table top 11 so as to provide clearance for movement of the finished lids L from the assembly station 16 into the magazine 15. The other post members 136, 136' are spaced at the opposite side of the magazine 15 and secured in parallel, upstanding relation on the table top 11 by angle brackets 137, 137'. A semi-circular guide or stop ring member 138 is secured by angle brackets 140 to the top 11 on the outboard side of the magazine and three spirally grooved lifting rollers 141, 142 and 143 are spaced in triangular relation about the bottom of the magazine for lifting the lids which are centered by the stop member 138 into the stack as they are delievered to the bottom of the magazine by the reciprocating feed ring 116. The grooved rollers 141, 142 and 143 are mounted on the upper ends of vertical shafts 109, 109' and 145. The shaft 145 carries a gear 146 which is connected in driving relation with the gears 147, 148 on the bottom of the shafts 109 and 109' through an idler gear 150 mounted on the vertical idler shaft 151. The shafts 109, 109', 145 and 151 are journaled in vertically spaced, horizontally disposed frame plates 152 and 153.

Figure 2:
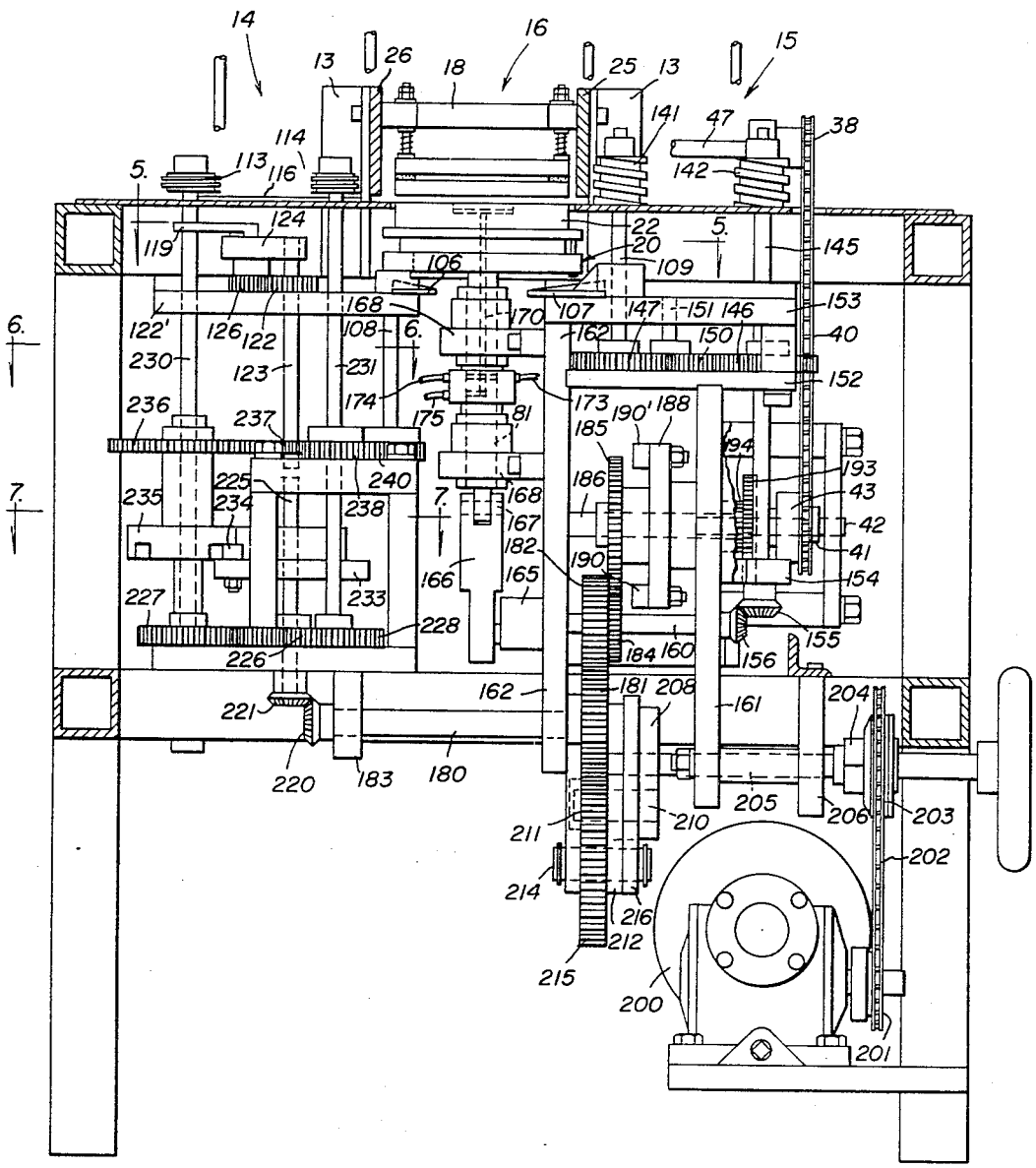
FIGURE 2 is a vertical section taken on the line 2—2 of FIGURE 1, with portions broken away.
Figure 3:
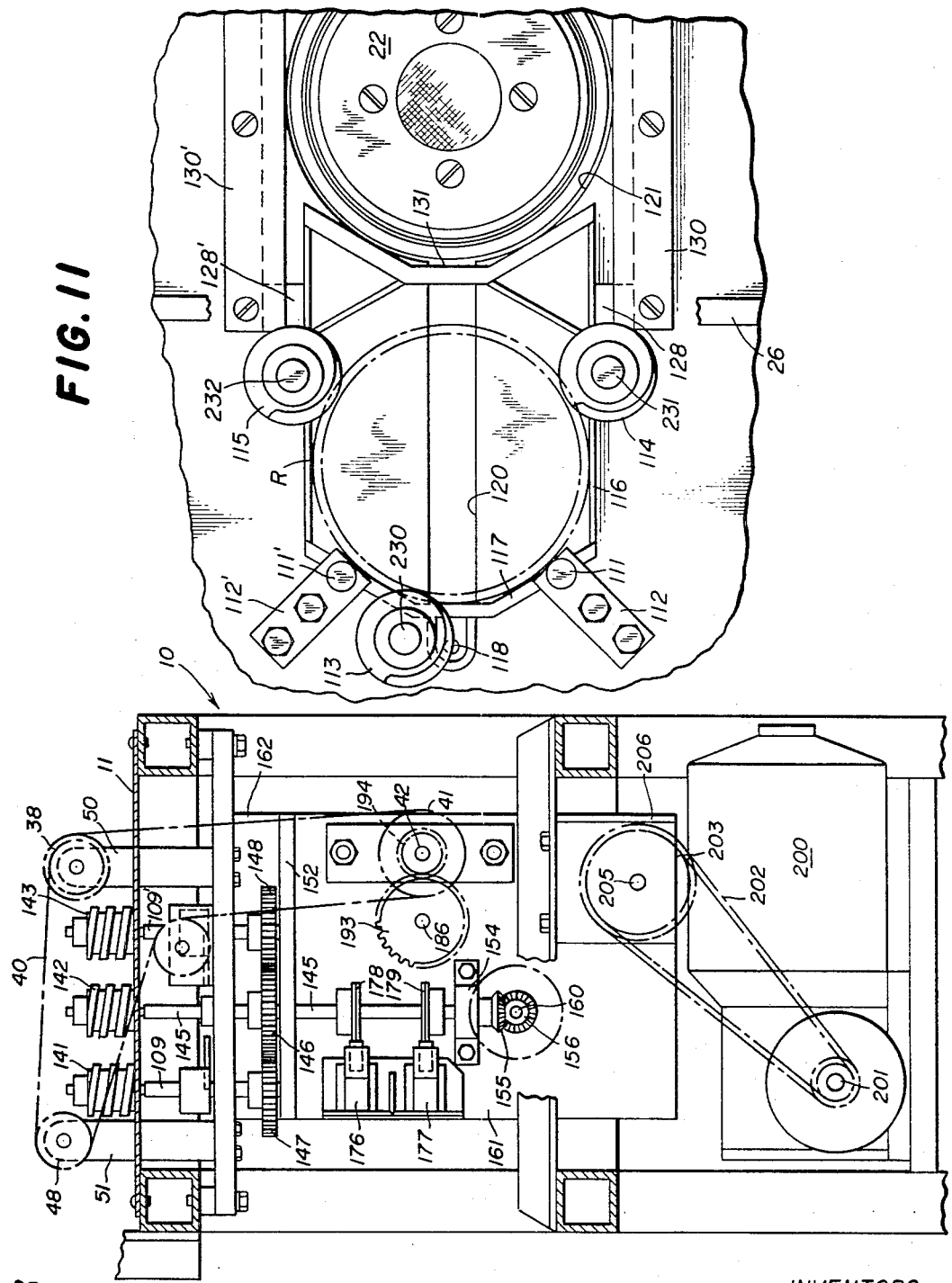
FIGURE 3 is a vertical section taken on the line 3—3 of FIGURE 1, with portions broken away.
Figure 4:
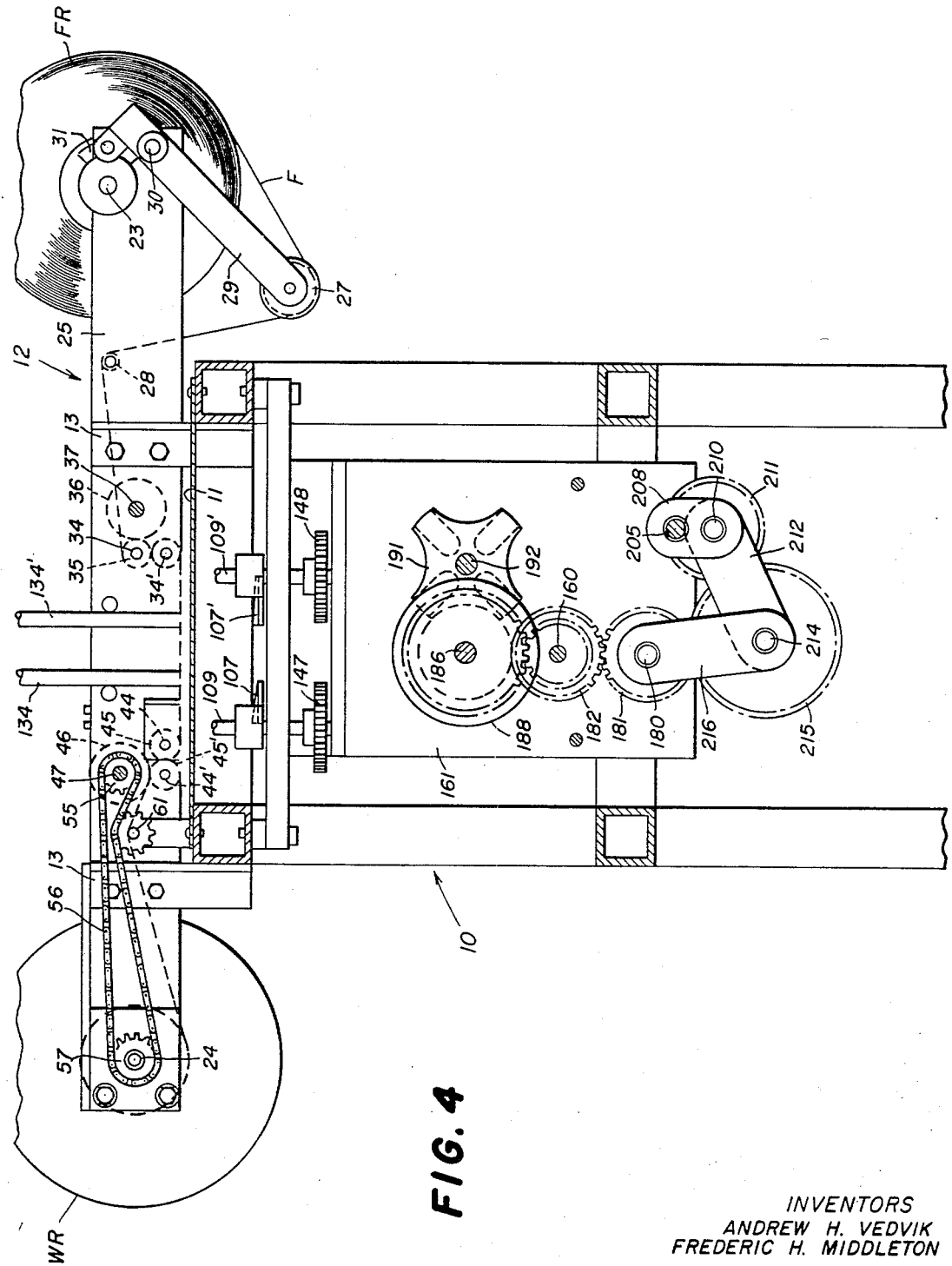
FIGURE 4 is a vertical section taken on the line 4—4 of FIGURE 1, with portions broken away.

The shaft 145 (FIGURE 3) extends below the frame plate 152 and has its lower end journaled in a bearing bracket 154. A miter gear 155 on the lower end is driven by engagement with miter gear 156 on a driven cross shaft 160 which is journaled in longitudinally spaced, vertical frame members 161 and 162 (FIGURE 2). A crank 165 on the inner end of the drive shaft 160 is connected to the lower end of connecting rod 166 which is in turn connected by the pivot pin 167 with the lower end of the piston rod 81 of the reciprocating plunger assembly 20. The piston rod 81 is mounted in sleeve members carried in vertically spaced brackets 168 on the inside of the frame plate 162. The piston rod 81 has an axial passageway 170 which connects with the passageway 104 in the top plate member 82 of the assembly 22 and which has vacuum and air line connections at 173, 174 and 175 with suitable conduits (not shown) running to vacuum and air valves 176 and 177 (FIGURE 3). The air valves 176 and 177 are controlled by plate cams 178 and 179 on the vertical shaft 145 which drives the lid elevating mechanism in the magazine 15.

The crank shaft 160 (FIGURES 2 and 4) is driven from a main drive shaft 180 through connecting gears 181 on the shaft 180 and 182 on the shaft 160. The shaft 180 is journaled in the vertical frame plates 162 and 183. The shaft 160 carries a gear 184 which engages in driving relation with a gear 185 on a cross shaft 186 which is journaled in the vertical frame plates 161 and 162. The shaft 186 carries a Geneva driver 188 which is provided with two peripherally spaced rollers 190 and 190' adapted to engage in the radial slots of a Geneva cam 191 mounted on cross shaft 192, the latter being journaled in the frame plates 161 and 162 and carrying a gear 193 which is in driving relation with the gear 194 on the shaft 42 which drives the film feed mechanism.

Figure 6:
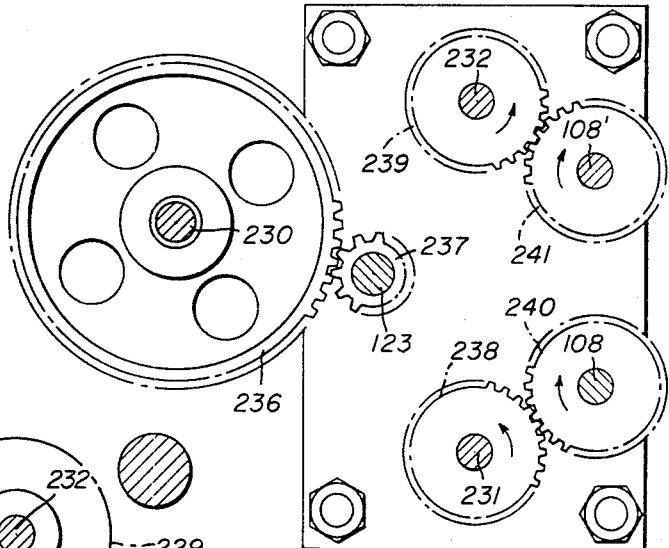
FIGURE 6 is a fragmentary horizontal section, taken on the line 6—6 of FIGURE 2 to an enlarged scale.
Figure 7:
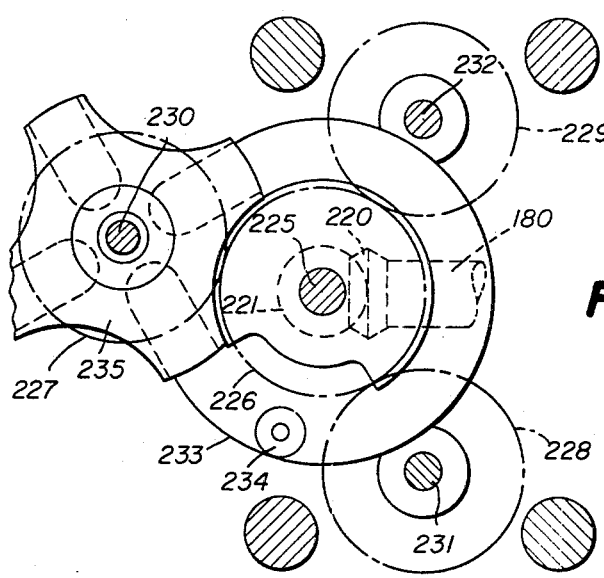
FIGURE 7 is a fragmentray horizontal section, taken on the line 7—7 of FIGURE 2, to an enlarged scale.

Power is fed into the machine from a gear motor 200 (FIGURES 2 to 4) having an output sprocket 201 which is connected by chain 202 with the sprocket 203 of an overload clutch 204 located on the stub shaft 205 which is journaled in spaced vertical frame plates 206 and 161. A crank 208 on the end of the shaft 205 has a crank pin 210 locked to the crank and to a gear 211. The path of motion of the gear center is a circle since the gear is locked through the pin and there is no relative tooth motion to the pin but rotary motion with respect to the center of rotation of the shaft 205. Also connected to the crank 210 is a connecting rod 212 which oscillates about the crank pin 210. At the other end of the connecting rod 212 is an idler pin 214 which has mounted on it an idler gear 215 and two connecting rods 216. The idler gear 215 meshes with the crank gear 211 and also with an output gear 181 on the main power shaft 180. The purpose of this drive mechanism is to create rotary output with an uneven output speed while holding constant input speed. This is employed in order to gain time during the slow output for operations during the timed relationships of feeding lids, cutting film, indexing film, etc. The action of this three gear mechanism is a cranking by the input that slows the output to a standstill at one part of the stroke. The uneven speed output is then taken from the gear 181 for operation of the shaft 180. The shaft 180 (FIGURES 2, 6 and 7) carries at its end a miter gear 220 which drives a miter gear 221 on the lower end of a vertical drive shaft 225. The drive shaft 225 carries a gear 226 (FIGURE 7) which meshes in driving relation with gears 227, 228 and 229 on the vertical shafts 230, 231 and 232 on the upper ends of which the ring drop rolls 113, 114 and 115 for the ring infeed magazine are mounted. The shaft 225 also carries a Geneva drive member 233 with a single roller 234. The roller 234 operates in the radial slots of the Geneva cam 235 which is rotatably mounted on the vertical shaft 230 along with an output gear 236. Gear 236 meshes with gear 237 on the vertical shaft 123 and drives the mechanism for reciprocating the ring feed plate 116. Shafts 231 and 232 which are driven by shaft 225 through gears 226, 228 and 229 carry gears 238 and 239 (FIGURE 6) which engage gears 240 and 241 on shafts 108 and 108' on which the ejector cams 106 and 106' are mounted. Thus both pairs of ejector cams 106, 106' and 107, 107' are driven by gear and shaft connections extending from the main drive shaft 180.

In the operation of the machine the magazine 14 is supplied with a stack of the rings R and a supply roll FR of the appropriate film is mounted on the holder 23. The film is threaded between the two sets of drive rolls 34, 34' and 44, 44' so as to extend across the work station 16, immediately above the table top 11 with the leading end attached to the drum 24. The drive mechanisms are then placed in operation and the film F is advanced intermittently in timed relation to the operation of the ring feeding and sheet cutting and placing mechanisms. The ring feed member 116 is reciprocated by operation of the sun gear 122 on the vertical shaft 123 to feed successive rings R to the work station 16 as they are released from the bottom of the stack by rotation of the drop rolls 113, 114 and 115. The sheet cutting and placing head 22 is reciprocated by rotation of the drive shaft 160 from a position below the table 11, where it receives the ring R and where it does not interfere with the movement of the ring feed member 116, to a position where it rests against the bottom of the tamping assembly 18. The head 22 is raised toward the tamping head 18 after the ring R is deposited thereon and lifts the ring into engagement with the film F and then into pressure engagement with the tamping assembly 18. The upward movement of the head 22 clamps the film F against the bottom of the ring member 72 of the tamping head assembly 18 and causes the knife 91 to cut the sheet S from the film F, with the margins of the sheet being seated in the seaming channel C of the ring R by portion 103 of member 72 so as to contact the adhesive A. The head 22 is then retracted to a position where the top surface 90 is level with table surface 11 and the ejector ring 94 is retained by the cams 106 and 107 to break free the completed lid assembly L and to leave it in a position for removal into the bottom of the magazine 15 by operation of the feed member 116 as the latter feeds the next ring R, the forward edge 131 of the feed member 116 engaging the finished lid L and moving it into the bottom of the magazine 15 where it is raised into a stack by rotation of the spirally grooved lifting rollers 141, 142 and 143. The head 22 drops to its lowermost position for receiving the next ring R which is delivered on the same stroke by the feed member 116 and the feed member 116 is free to move to retracted position. The movements of the respective members are timed, by operation of the various drive mechanisms which have been heretofore described, so as to perform the successive operations. The machine will operate continuously and automatically feed the blank rings, cut and place the sheets and deliver the finished lids to the magazine 15 so long as the blank rings are supplied to the magazine 14 and there is a supply of the film F.

While particular materials and specific details of construction have been referred to in describing the illustrated form of the machine, it will be understood that other materials and structural details of an equivalent nature may be resorted to within the spirit of the invention.

We claim:
1. A machine for placing window forming sheets of flexible film material in ring-type container closure members which are characterized by a channel-shaped peripheral portion adapted for co-operation with the top margins of a container in forming a seam which attaches the closure to the container, said machine comprising an upright support magazine for accommodating a stack of said ring members on said top portion, a work station adjacent the bottom of said magazine, a reciprocating head at said work station, means for feeding successive ring members from the bottom of a stack in said magazine to the reciprocating head at said work station, a tamping frame disposed opposite said reciprocating head, means for feeding a web of film material between said tamping frame and said reciprocating head at said work station, and means on said reciprocating head and tamping frame at said work station for cutting successive sheets from said web and seating the margins of each successive sheet in the seam forming portion of a ring member.

2. A machine as recited in claim 1, and said ring feeding means including means at the bottom of said magazine for detaching the bottommost ring member from the supply stack and for positioning successive ring members for movement out of the magazine.

3. A machine as recited in claim 1, and said ring feeding means comprising a reciprocably mounted frame having spaced pusher forming portions for feeding a ring from the supply magazine to the work station and for advancing a ring previously fed beyond the work station.

4. A machine as recited in claim 1, and said ring feeding means including a reciprocably mounted ring receiving frame having oppositely disposed side members and track forming guide members mounted on opposite sides of the work station for holding the reciprocable frame in a predetermined path so as to feed each successive ring into predetermined position at said work station.

5. A machine for placing window forming sheets of flexible film material in ring-type container closure members which are characterized by a channel-shaped peripheral portion adapted for co-operation with the top margins of a container in forming a seam which attaches the closure to the container, said machine comprising an upright support frame having a table-like top portion, means forming a supply magazine for accommodating a stack of said ring members on said top portion, a work station adjacent the bottom of said magazine, means for feeding successive ring members from the bottom of a stack in said magazine to said work station, means for feeding a web of film material to said work station, means at said work station for cutting successive sheets from said web and seating the margins of each successive sheet in the seam forming portion of a ring member, and said ring feeding means including spaced drop rollers having spiral grooves for detaching the bottommost ring member from the stack, a ring receiving frame mounted for reciprocation in a path laterally of the stack and drive means for reciprocating said ring receiving frame between a ring receiving position at the bottom of the magazine and a ring depositing position at the work station.

6. A machine as recited in claim 1, and said ring feeding means including a feed frame having a pocket for receiving a ring member dropped from the bottom of the stack and power means for reciprocating said feed frame in a path extending between the magazine and the work station which power means includes a fixed sun gear and a stroke arm which is mounted on a rotatable shaft having a gear connection with said sun gear.

7. Apparatus for placing window forming sheets of film material in ring-type container closure members which are characterized by a peripheral channel formation having an adhesive substance therein and adapted for co-operation with the margins of a container mouth in forming a connecting seam, which apparatus comprises a supporting frame, means thereon constituting a sheet placing station, means for feeding film material into position at said station, means at one side of said station for supplying successive closure members to said station, means at said station for clamping the film material in predetermined relation to successive closure members, means to seat portions of said film material in the channel formation of each closure member and means to trim the film material on a line extending about the edge of the channel formation.

8. Apparatus as recited in claim 7 and said means for clamping the film material comprising a support fixed above said station and having a film clamping ring member carried thereon, a reciprocating head having means thereon for receiving successive closure members and means for engaging the film material which is aligned with said film clamping ring member, and power means for reciprocating said head in a path to engage said film clamping ring member.

9. Apparatus as recited in claim 8 and said means for clamping the film comprising also a spring pressed vertically movable mounting for said film clamping ring member.

10. Apparatus as recited in claim 8 and said means for clamping the film material comprising a spring pressed frame mounted on said fixed support and said film clamping ring member having a resilient pivotal connection with said spring pressed frame.

11. Apparatus as recited in claim 7, and said means for seating portions of the film material in the channel formation comprising a fixed support above said station having a resiliently mounted film tamping member and a reciprocating head having means thereon for receiving successive closures and power means for reciprocating said head to bring each successive closure member carried thereon into engagement with the film material and the tamping member so as to seat the film material in the channel formation of the closure member.

12. In an apparatus for placing window forming sheets of film material in ring-type closure members which are characterized by a peripheral channel formation having an adhesive substance therein and adapted for co-operation with the margins of a container mouth in forming a connecting seam, wherein the apparatus comprises a supporting frame having a sheet placing work station, means for feeding film material into position at said work station and means for feeding successive ring closure members to said station and for discharging the closure members from said station, a mechanism for supporting successive ring members and clamping portions of the film material in predetermined position while a window forming sheet is cut and marginal portions thereof are seated in the channel formation in each ring member, said mechanism comprising a film clamping and tamping assembly disposed on one side of the path of the film material at said work station, a closure member supporting and film clamping and cutting assembly on the opposite side of the path of the film material at said work station, and means for effecting relative movement of said assemblies toward and from each other.

13. In an apparatus as recited in claim 12, and said closure member supporting and film clamping assembly comprising a reciprocably mounted head having spring pressed film engaging means for co-operation with the film clamping and tamping assembly, and slidably mounted means normally positioned out of the path of the film for supporting the closure member.

14. In an apparatus as recited in claim 13, and the means for supporting said closure member comprising a supporting ring mounted on slidable pins which are on said head and have portions in the path of rotating cams which are operative to move the supporting ring so as to position a closure member carried thereon for discharging from said work station by said closure feeding means.

15. In an apparatus as recited in claim 13, and said head having vacuum means thereon for pulling the closure member free of the film clamping and tamping assembly when the assemblies are moved away from each other.

16. In an apparatus as recited in claim 12, and said closure member supporting and film clamping and cutting assembly comprising a reciprocably mounted head having a slidably mounted film clamping ring, a slidably mounted support for a closure member and a film severing blade between the same for co-operation with the film clamping and tamping assembly.

17. In an apparatus as recited in claim 16, and power drive means for reciprocating said head so as to move the same into engagement with said film clamping and tamping assembly and thereafter to retract the head to an intermediatae dwell position for receiving a succeeding closure member.

18. In an apparatus as recited in claim 17, and said power means including a main power shaft, a crank shaft, a variable speed connection between the power shaft and the crank shaft and a crank connection between the crank shaft and the reciprocably mounted head.

19. In an apparatus as recited in claim 17, and said power drive means having a driving connection with said film feeding means and said closure feeding means which includes Geneva drive mechanism for intermittently operating each of said feeding means in timed relation to the operation of said head.

20. In an apparatus as recited in claim 12, and said film clamping and tamping assembly including an outer ring-like supporting member, an inner ring-like supporting member attached to said outer supporting member by resilient hinge forming means for limited swinging movement on an axis extending in the plane of said supporting members, and a ring-like anvil forming member attached to said inner supporting member by resilient hinge forming means for limited swinging movement on an axis which is disposed opposite the hinge axis of said inner supporting member, said anvil member having an anvil forming surface facing the path of said film material and aligned for co-operation with said closure member supporting and film clamping and cutting assembly.

21. In an apparatus as recited in claim 12, and said film clamping and tamping assembly being resiliently mounted on a fixed frame support.

22. In an apparatus as recited in claim 12, and said film clamping and tamping assembly being mounted for sliding movement toward and from the path of the film material and cushion forming resilient means urging said assembly in the direction toward said film path.

References Cited

UNITED STATES PATENTS

| 2,332,445 | 10/1943 | Grim | 29—208 |
| 2,840,892 | 7/1958 | Erdmann | 29—211 |
| 3,302,278 | 2/1967 | Whitney. | |
| 3,328,873 | 7/1967 | Schweers | 29—211 X |

THOMAS H. EAGER, Primary Examiner

U.S. Cl. X.R.

29—211